United States Patent [19]
Dorough, Jr.

[11] 3,844,535
[45] *Oct. 29, 1974

[54] PORTABLE ELECTRIC AUTOMOBILE JACK

[76] Inventor: Joe Dorough, Jr., 3000 W. Irving Blvd., Apt. 422, Austin, Tex. 75060

[ * ] Notice: The portion of the term of this patent subsequent to Sept. 19, 1988, has been disclaimed.

[22] Filed: Apr. 1, 1971

[21] Appl. No.: 130,278

Related U.S. Application Data

[63] Continuation-in-part of Ser. No. 841,742, July 15, 1969, Pat. No. 3,606,252.

[52] U.S. Cl. ............................................. 254/103
[51] Int. Cl. ............................................ B66f 3/18
[58] Field of Search ............................ 254/98–103, 254/DIG. 2, 98–107

[56] References Cited
UNITED STATES PATENTS

| | | | |
|---|---|---|---|
| 2,981,518 | 4/1961 | Wise | 254/103 X |
| 3,376,019 | 4/1968 | Weiss | 254/103 |
| 3,392,959 | 7/1968 | Lewis | 254/103 |

*Primary Examiner*—Othell M. Simpson
*Attorney, Agent, or Firm*—M. E. Shafer

[57] ABSTRACT

A portable electric automobile jack that raises and lowers the bumper of a vehicle in a smooth, continuous motion using electric power produced by the automobile but the structure of which is otherwise independent from the body of the automobile, thereby enabling the jack to be disassembled, transported to other vehicles when needed and stored in the trunk of the automobile.

6 Claims, 8 Drawing Figures

PATENTED OCT 29 1974　　　　　　　　　　3,844,535

JOE DOROUGH, JR.
INVENTOR.

BY *Marion E. Shofer*

ATTORNEY.

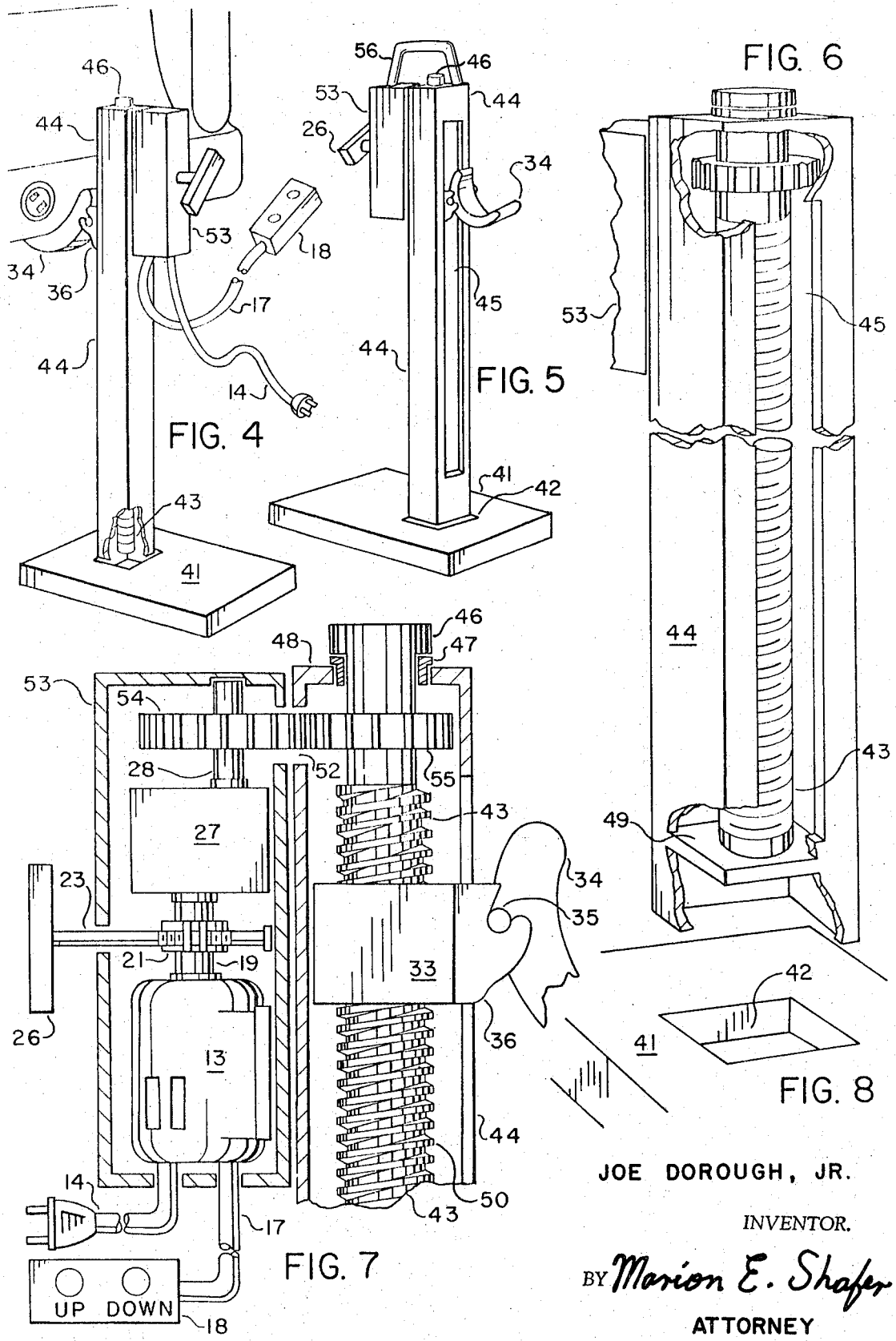

PORTABLE ELECTRIC AUTOMOBILE JACK

This is a continuation-in-part of application Ser. No. 841,742, filed July 15, 1969, now U.S. Pat. No. 3,606,252.

SUBJECT MATTER OF INVENTION

This invention relates to lifting devices, and more particularly, it relates to a portable jack for vehicles that is electrically operated, yet which is not a permanent part of the vehicle.

BACKGROUND OF THE INVENTION

In the past, many devices and means by which a vehicle may be raised to facilitate the changing of a tire, or perform other repairs have been designed. The most common is the standard hand operated jack which is standard equipment in most cars. These require much strain and considerable mental anguish as well to get them to perform their desired function. The jacks must be cranked up by hand, a job which is very difficult for a woman, and often for a man as well. Such hand operated jacks frequently jam due to the inadequate means for shifting their direction of operation. This often results in injury or damage to the vehicle as it must be driven off the jack or the jack must be kicked out from under the car. Another fault of these hand operated jacks is that they often slip as they are lifted by a ratchet device.

Another form of jacking device is the hydraulic. Systems have been designed whereby these hydraulic jacks are installed at great cost in the vehicle, with one jack for each wheel. This is required due to the extreme weight of the jacks, which make them impossible to lift or carry. Such permanent hydraulic jacks add considerable excess weight to the vehicle since the jacks are permanent parts of the car.

A further problem with previously available mechanical jacks has been that stout people find it practically impossible to get down to the position required to position and operate such jacks.

OBJECTS OF THE INVENTION

It, therefore, becomes an object of this invention to provide an electrically operated automobile jack that will raise and lower an automobile for repairs and various other maintenance with minimum stooping and physical exertion on the part of the operator since it is electrically operated and requires no cranking of any kind.

A further object of this invention is to provide a portable automobile jack that can be positioned and operated with a minimum of stooping by the operator.

Another object of this invention is to provide a portable automobile jack that is compact and light in weight so that it can be easily carried in the trunk of a car in the same manner as the standard jack and quickly assembled when needed. Said jack is also designed to quickly and easily be lifted, assembled and operated by women and people with limited strength.

Another object of this invention is to provide a portable automobile jack that can be operated by the power source produced by the vehicle, eliminating dependence upon or the necessity of carrying a separate power supply.

Another object of this invention is to provide an electric automobile jack that will lower the car in the same smooth motion by which it was raised by simply pushing the opposite buttom on the directional switch as was used to raise the jack.

Another object of this invention is to provide a portable automobile jack that does not have to be installed under the frame of the car, therefore eliminating the additional weight that would be added to the car by a plurality of permanently mounted jacks and enabling the jack to be used on vehicles other than the owner's.

Still another object of the invention is to create an electric auto jack that can be operated from the side of the car where the operator can observe the tire during the lifting operation, which will also permit the operator to manipulate the jack from a position of safety on the side of the car in case the car should roll off of the jack.

Still another object of the invention is to create an alternate embodiment of said electric jack with most of the electrical and mechanical parts built into a vertical housing structure that will make the device more convenient to handle and that will produce a neater and more presentable package.

These and other objects and advantages of this invention will become apparent through consideration of the following description and appended claims in conjunction with the attached drawings in which:

DESCRIPTION OF THE SEVERAL VIEWS IN THE DRAWINGS

FIG. 4 is a perspective view, from the rear, of an alternate version of said electric jack showing the jack in use.

FIG. 5 is a perspective view of the assembled alternate embodiment of said electric jack viewed from the front.

FIG. 6 is a detailed front view of the lift housing portion of said alternate embodiment of the electric jack.

FIG. 7 is a fragmentary section view of the upper end of said alternate version of the electric auto jack showing the arrangement of mechanical parts inside the special housing provided in said alternate embodiment.

FIG. 8 is a fragmentary perspective view of the base plate for said jack showing the well in which the vertical housing of FIG. 6 sits.

Figure 1:
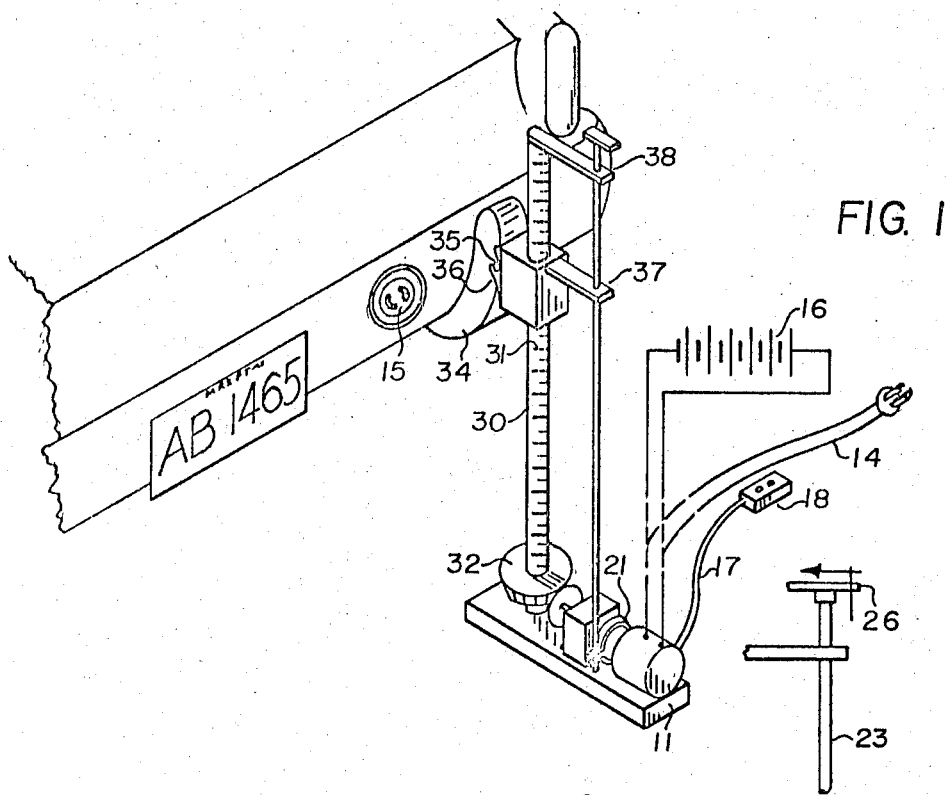
FIG. 1 is a perspective view of the portable electric automobile jack described herein showing the jack assembled and in use to lift an automobile.

In describing one selected form or preferred embodiment of this invention as shown in the drawings and described in this specification, specific terms and components are used for clarity. However, it is not intended to limit the claimed invention to the specific form, components or construction shown and it is to be understood that the specific terms used in this illustration of the invention are intended to include all technical equivalents which operate in a similar manner to accomplish a similar purpose.

DETAILED DESCRIPTION OF PREFERRED EMBODIMENT OF INVENTION

Referring to the specific embodiment of the invention selected for illustration in the accompanying drawings, the Number 11 designates a rectangular base plate upon which the heavier parts of the mechanical apparatus are mounted. Bearing well 12 is recessed into the upper surface of base plate 11 near one end of said base to receive and provide support for a vertically positioned insertable-removable lift shaft. Said bearing well 12 is provided with suitable bearing surface material to facilitate free rotation as well as support for the lift shaft.

At the opposite end of said base plate 11 is mounted a reversible electric drive motor 13 selected to operate from a low voltage DC electrical power source such as the battery of the automobile with which the jack is to be used. A suitable power connected cable 14 is provided to connect said motor 13 to a suitable electric source such as an adapter socket 15 mounted in the bumper of the car, on the body of the car or inside the trunk of the car or any suitable external electric power source represented by battery symbol 16. Control cable 17 extends between electric motor 13 and switch box 18 which is provided with two switches and switching circuits connected in such manner as to cause motor 13 to rotate in a clockwise direction so long as the first switch is depressed and to cause the motor to rotate in the opposite direction while the second or reverse switch is depressed. With neither switch depressed said electric motor 13 will be turned off and will not operate. It will be appreciated that a variety of electric and mechanical devices could be substituted to reverse the direction of drive supplied by the motor, and parts 17 and 18 are meant to designate only a means of reversing the direction of electric drive provided by motor 13. It should also be appreciated that direction switch assembly 18 could be fabricated in the form of a pair of foot pedal switches so that they could be operated from a standing position or either direction control device could be held in the operator's hand while in use. Note that this precludes the necessity of the operator stooping over while operating the jack.

Drive shaft 19 from electric motor 13 extends toward bearing well 12 and at an intermediate point on said drive shaft is mounted a drum with a brake shoe surface 20 and this half of the brake mechanism will hereafter be referred to as brake shoe 20. The two halves of brake clamp 21 are mounted on brake support pin 22 and extend around brake shoe 20 so that they provide a friction braking action when they are tightened by brake control rod 23. Said brake control rod 23 is provided with suitable threads on the lower portion of said rod 23 which engage reciprocal threads provided in the lips 24 of brake claim 21. Said brake clamps 21 are tightened or loosened in a conventional manner by rotating brake control rod 23 which is provided with a suitable handle 26 to facilitate manual operation of said brake. It will be readily apparent that an automatic brake or an automatic electric brake could be substituted to provide an alternate means of braking when the drive motor is not in use to raise or lower the lift carriage mechanism.

The rotational energy from electric motor 13 is fed via drive shaft 19 into the input of a standard gear box assembly 27 which decreases the speed of the rotary motion and increases the torque of the device. The rotary output from said gear box assembly 27 is fed via output gear shaft 28 to a vertically positioned bevel gear 29 which is mounted on the end of output gear shaft 28.

Vertically positioned insertable - removable lift shaft 30 is provided with a bearing surface at its lower end and is adapted to fit into bearing well 12 in such manner as to be held in a vertical or upright position with respect to base plate 11. Most of the upper part of lift shaft 30 is provided with a worm gear thread 31 and a horizontally positioned bevel gear 32 mounted at an intermediate point on the lower part of lift shaft 30 at such a point as to engage vertically positioned bevel gear 29 to convert horizontal rotary motion from electric motor 13 into vertical rotary motion and of course such vertical rotary motion is transmitted to lift shaft 30 on which said bevel gear 32 is mounted.

Lift carriage assembly 33 is provided with an internal worm gear or thread and operates much like a nut on a bolt so that said carriage will ride up or down on worm gear threads 31 on lift shaft 30 as said lift shaft is rotated in one direction or the other. Bumper hook 34 is attached to the forward end of lift carriage assembly 33 by means of bar hinge 35 which set into hinge hooks 36 and 36 on the opposite forward sides of said lift carriage assembly 33. Since bumper hook 34 and bar hinge 35 readily lift out of hooks 36 — 36 on carriage assembly 33 it can be readily seen that a variety of interchangeable sizes and shapes of bumper hooks can be provided to adapt said electric jack to a variety of models of automobiles and to permit adaptation of the jack for use with future automobiles. Extending from the rear end of said lift carriage assembly 33 is a horizontal rod stabilizer 37 provided with a hole through said stabilizer to secure brake control rod 23 as shown in FIGS. 1 and 2 of the drawings.

A horizontal handle 38 is pivotally connected to the top of lift shaft 30 which enables the operator to insert lift shaft 30 into bearing well 12 and to position the jack from a standing position. Said handle 38 also is provided with an opening at the remote end from the pivot so that said handle 38 also serves as a stabilizer for brake control rod 23 which is passed down through the openings in handle 38, stabilizer 37 and screwed into lips 25 of brake clamp 21. This arrangement of parts enables lift shaft 30, brake control rod 23 and associated stabilizer supports to provide mutual support and vertical alignment of the upper parts of the jack.

Electric motor 13, brake mechanism 20 and 21, gear box assembly 27 and vertically positioned bevel gear 29 are permanently mounted on base plate 11 and constitute one packaged part of said jack that is easily handled, moved and stored as a unit. On the other hand the upstanding or vertical parts of the jack including lift shaft 30, brake control rod 23 and lift carriage assembly 33 either plug or screw into the base during use only, and after usage may be detached from the base plate for convenient handling and separate storage.

Figure 2:
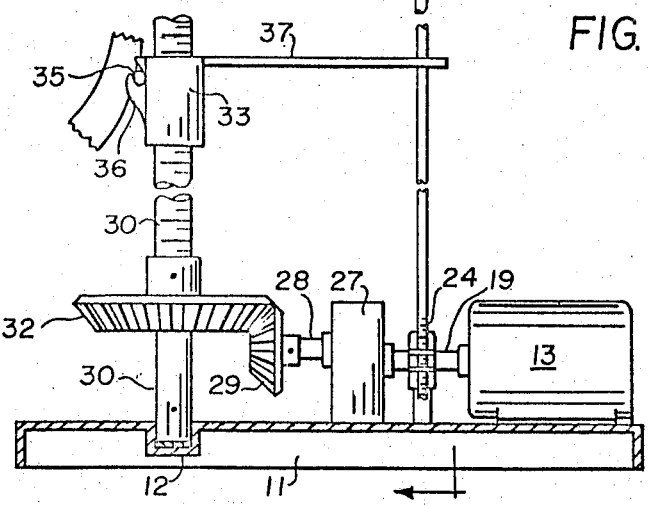
FIG. 2 is a partial side view of the mechanical parts of the invention.
Figure 3:
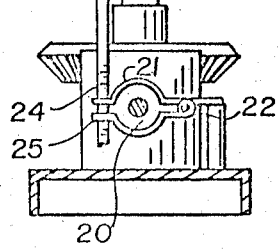
FIG. 3 is a partial cut away end view of the device showing the braking mechanism.

The basic functional mechanical features of the stripped down essentials of my invention as illustrated in FIG. 1 through FIG. 3 are set forth in my original patent application, now U.S. Pat. No. 3,606,252, and FIGS. 4 through 7, herein, illustrate an alternate configuration of equivalent functional mechaniical elements in a vertical housing arrangement that makes for a neater and more convenient package.

In describing this alternate embodiment of the invention we will again start with a new base plate 41 adapted to lie securely on the ground which also has provided in its upper surface a securing and support well 42 adapted to receive and support an upright member in said well. In order to better provide against old lift shaft 30, as illustrated in FIG. 1 and FIG. 2 of the drawings, from turning or twisting in support well 12 as an unbalanced load is lifted new support well 42 in base plate 41 has been made square or at least rectangular and new lift shaft 43 has been mounted in an elongated and vertically positionable lift shaft housing structure 44 which is provided with a generally square cross section shape and the lower end of which is adapted to be insertably-removably seated in support well 42 provided in the upper surface of base plate 41. Said lift shaft housing structure 44 is an elongated structure and is provided with a longitudinal slot - like opening 45 in one face of said housing structure 44 to permit a lift carriage assembly and bumper hook to extend through said slot - like opening to the outside and ride up and down on lift shaft 43.

Within elongated lift shaft housing 44 there is mounted a rotatable lift shaft 43. Said rotatable lift shaft 43 is suspensively mounted within housing 44 by means of a special bearing shoulder 46 at the upper end of said lift shaft 43 which in turn rides in and on a bearing collar 47 which is provided in an appropriate opening in top closure cover 48 of lift shaft housing 44. The centering and support of lift shaft 43 may be assured by providing a lower bearing plate 49 as illustrated in FIG. 6 of the drawings herein and by means of a bearing surface provided on the lower end of lift shaft 43 and a reciprocal bearing collar provided in said bearing plate 49. Said bearing surface and bearing collar at the lower end of lift shaft 43 cannot be seen because of the nature of the drawing but may be logically inferred. It may be that upper bearing shoulder 46 and bearing collar 47 will provide sufficient support for lift shaft 43 such that bearing plate 49 and a lower mounting and support means for lift shaft 43 may be dispensed with as illustrated in the lower portion of FIG. 4 of the drawings herein. However, this is a matter that will have to be determined by experience in building and testing actual prototypes. Said rotatable lift shaft 43 is provided with a threaded worm gear surface 50 cut into most of the length of said vertical shaft and rotary motion is transferred to said lift shaft by means of a transfer gear wheel 55 mounted at an intermediate point near the upper end of rotatable lift shaft 43 in such position as to extend into a gear engagement opening 52 provided in said lift shaft housing.

The reversible motor and electric drive mechanism that was formerly mounted on base plate 11 in the first version of this electric jack has in this alternate version of the invention been consolidated, packaged and mounted in a generally rectangular drive mechanism housing structure 53 which is in turn mounted on the upper rear side of lift shaft housing 44. It should be noted that this repackaged alternate arrangement and relocation of electric drive motor 13 and the associated drive mechanisms places the electric motor in a position closer to the automobile bumper or trunk area where an electrical connection can be made so that connective electric power cord 15 can be made shorter while at the same time start-stop switch box 18 can now be operated conveniently from a standing position while making control cable 17 somewhat shorter with all of said apparatus permanently packaged and connected to lift shaft vertical housing 44 in a manner and position that is neater, more comfortable, more convenient and more secure. Said reversible electrical drive motor 13 is selected to be capable of operating from a DC voltage source, such as the battery of the automobile with which the jack is to be used, with said motor being mounted inside drive mechanism housing structure 53 as illustrated in FIG. 7 of the drawings herein. Except for relocation, power connector cable 14, control cable 17 and the controls provided in motor control switch box 18 work exactly the same as those provided in the first embodiment of the invention described in my previous U.S. Pat. No. 3,606,252 so that the same numbers have been assigned to these parts in new FIGS. 4, 5 and 7 as were employed in the drawings of the first embodiment of said electric automobile jack. Output gear drive shaft 19 from electric motor 13 couples to the input shaft into a standard gear box assembly 27, which is mounted inside said drive mechanism housing structure 53, to reduce the speed of rotation and to increase the torque to be delivered to rotary lift shaft 43. Electric motor 13 and gear box 27 are mounted in line with each other so that their respective drive shafts may be coupled together within mechanism housing 53 by any suitable means and in any suitable arrangement such that gear drive shafts are in sufficient alignment to be coupled to each other. At a suitable intermediate point along the length of electric motor output drive shaft 19, between the electric motor and standard gear box assembly 27 there is provided a suitable brake drum and brake shoe assembly 20 and 21 together with a suitable brake control rod 23 and brake control handle 26 such that rotation of brake control handle 26 can tighten or set brake assembly 20 and 21 and thereby prevent any rotary motion by rotary deive shaft 19. Although a band brake is shown for purposes of illustration, herein, other equivalent means of mechanical, fluid or electric braking may also be suitable for this application.

At an intermediate point near the upper end of one face of drive mechanism housing structure 53 there is provided a gear engagement opening that matches or coincides with a similar gear engagement opening 52 provided in one surface of lift shaft housing structure 44 as previously described so that there is an opening from the interior of lift shaft housing structure 44. For the purpose of transferring rotary drive power from the electric drive motor 13 and associated drive mechanisms described in the immediately preceding paragraphs there is provided a pair or a set of torque transfer gears 54 and 55 with one of said transfer gears 54 being mounted on the output gear drive shaft 28 of said gear box assembly 27 while the other meshing transfer gear 55 is mounted on the upper end of said rotatable lift shaft 43 in such position and at such height that each of said transfer gears extend into the housing openings provided in the walls of drive mechanism housing structure 53 and lift shaft housing 44 so that said pair of torque transfer gears 54 and 55 mesh with each other such that rotary drive torque is transferred from the said electric motor gear box assembly to the rotatable lift shaft as illustrated in FIG. 7 of the drawings herein.

The ultimate task of applying lift power to the bumper of an automobile is executed by means of a lift carriage assembly 33 and a suitable associated bumper hook 34. Said lift carriage assembly 33 is provided with an internal worm gear surface 50 provided on lift shaft 43 and thereby cause said lift carriage 33 to ride up or down lift shaft 43 depending upon the direction of rotation of said lift shaft. Lift carriage assembly 33 is tailored to ride on a worm gear provided on the surface of lift shaft 43 and to fit within lift shaft vertical housing 44 and to ride up and down as rotary torque is applied to lift shaft 43 within said vertical housing 44. On the forward face of said lift carriage assembly 33 there is provided a bar receiving hinge 35 which is adapted to extend through slot-like opening 45 in the forward face of lift shaft housing structure 44 to provide means of supporting the previously mentioned bumper hook 34. Said bumper hook 34 is attachably-detachably connected to hinge structure 35 by means of hinge bar 36 as illustrated in FIG. 5 and FIG. 7 of the drawings herein.

Handle means 38 has been illustrated at the upper end of the first embodiment of the invention as illustrated in FIG. 1 of the drawings to provide easy means of handling and moving said electric jack from a standing position. It should be readily apparent, however, that suitable handle means 38 could also be provided at the top of the alternate version of the electric jack as illustrated by the positioning and carrying handle 56 shown on top of the electric jack in FIG. 5 of the drawings. It will readily be appreciated by anyone reasonably skilled in the art that the components or equivalent components to perform the same or similar functions could be substituted for the parts described above without departing from the spirit or scope of the invention and that with only minor modification said electric jack apparatus could be packaged in other appropriate housing of varying configuration or exterior appearance without departing from the scope of the invention.

OPERATION

In operation, the jack is removed from the trunk of the car and base plate 11 placed near the position where the automobile is to be raised. The lifting and vertical components of the jack are assembled by inserting the end of lift shaft 30 into bearing well 12. Bumper hook 34 is then set on hinge hooks 35 — 35, brake control rod 23 is inserted through the handle and rod stabilizers 37 and screwed into lips 25 of brake clamp 21. The jack is then positioned with bumper hook 34 in the desired position to engage the bumper of the automobile to be lifted. A power cord 14 from the electric motor is plugged into a suitable outlet from the car's electric system or other suitable source to supply power to operate the motor and the jack. By depressing the first or lift switch on direction control switch box 18 power is applied to motor 13 in such manner as to cause said motor to turn in one direction. The rotary energy from said motor is delivered via drive shaft 19 to the input of gear box 27 where the speed of rotation is reduced and the torque is increased and the increased power is applied through gear shaft 28 to provide rotary drive to vertically positioned beveled gear 29.

Since horizontal bevel gear 32 is positioned to mesh with vertical gear 29 rotation of gear 29 transmits rotation to gear 32 and through it to lift shaft 30. Lift carriage assembly 33 is prevented from turning by engagement of bumper hook 34 with the bumper of the automobile being jacked up. As the worm gear threads in lift carriage assembly 33 as lift shaft 30 is rotated, the lift carriage is driven upward lifting the automobile with it. When the car is raised to the desired level, the lift button on switch 18 is released causing the motor and the jack to stop. To prevent the weight of the car from operating the jack in reverse, handle 26 is employed to turn brake control rod 23 and lock brake assembly 20 and 21.

It will be readily apparent that the second embodiment of said electric auto jack described above will operate or be used in a substantially similar manner to the operation procedure described for the basic version of the invention. The employment of a rectangular lift shaft housing 44 that will fit into well 42 of base plate 41 in only one position as shown in FIG. 6 and FIG. 8 of the drawings stabilizes and prevents twisting of the vertical lift shaft without having to use brake control rod 23 and rod stabilizer 37 to help keep the parts of the jack in alignment. The brake control rod and handle are shorter and more conveniently located on the alternate packaged version of the invention and the simplicity of use will be readily evident by examination of FIG. 7 of the drawings.

When the repair work on the automobile is completed, said brake control is released and the reverse button on switch 18 is depressed which causes electric motor 13 to turn in the reverse direction which operates the previously described train of transmission of rotary power in reverse lowering lift carriage assembly and the and the automobile in a gradual manner. The jack is then unplugged, disassembled and the component parts of the jack returned to their customary storage place.

ADVANTAGES

A principal advantage of this invention is that the electric automobile jack will raise and lower an automobile for repairs and maintenance without the need of physical exertion on the part of the operator since it is electrically operated and requires no cranking of any kind.

Another advantage of this invention is that the electric automobile jack is light in weight and can be easily carried in the trunk of a car in the same manner as the standard jack and quickly assembled when needed. It is also sufficiently portable and adaptable that it can be used with other cars when needed.

Still another advantage of this invention is that the electric automobile jack can be operated by the power source produced by the vehicle, thus eliminating the necessity carrying a separate power supply.

Another advantage of this invention is that the electric automobile jack will lower the car in the same smooth motion it raised it by simply pushing the opposite button on the directional switch as was used to raise the jack.

A still further advantage of said portable electric jack described herein is that it can be operated almost entirely from a standing position which is of considerable importance to stout people.

Another advantage of this invention is that this portable electric automobile jack does not have to be permanently installed under the frame of the car and therefore eliminates the additional weight that would be added to the car by installation of permanently installed jacks at each corner of the automobile.

Another advantage of said electric auto jack is that it is so designed that the operator can operate the jack from a remote control position on the side of the car where he can observe the tire as the auto is lifted or lowered and where he will be in a position of improved safety if the auto rolls off of said jack.

Although this specification describes but a single embodiment of the invention with certain applications thereof, it should be understood that structural or material rearrangements of adequate or equivalent parts, substitutions of equivalent functions elements and other modifications in structure can be made and other applications devised without departing from the spirit and scope of my invention. I therefore desire that the description and drawings herein be regarded as only an illustration of my invention and that the invention be regarded as limited only as set forth in the following claims.

Having thus described my invention, I claim:

1. A portable electrically operated automobile jack comprising:
   A. a base plate adapted to lie securely on the ground and provided with a securing and support well in its upper surface for an upright member;
   B. an elongated and vertically positionable lift shaft housing structure having a generally square cross section shape and
      1. adapted to seat in the well provided in the upper surface of the base plate, and
      2. being provided with a longitudinal slot - like opening in one face of the housing structure;
   C. a rotatable lift shaft vertically positioned within said lift shaft housing having
      1. a worm gear surface cut into most of the length of said vertical lift shaft, and
      2. at least one support bearing surface to provide support mounting engagement with the bearing provisions in said lift shaft housing;
   D. a generally rectangular drive mechanism housing structure mounted on the rear side of the vertically positioned housing for said rotatable lift shaft;
   E. a reversable electric drive motor capable of operating from a DC voltage source, such as the battery of the automobile with which the jack is to be used, said motor being mounted inside the drive mechanism housing structure including a power connector cable adapted to connect to a suitable source of electric power;
   F. means for turning said electric motor off and on and for controlling the direction of rotation;
   G. means for transferring rotational power from the electric motor to said lift shaft including means of reducing the speed and increasing the torque of the rotational power delivered to the jack;
   H. brake means for locking said jack when the electric motor is turned off;
   I. a lift carriage assembly adapted to ride up or down the worm gear on the lift shaft depending upon the direction of rotation of said shaft;
   J. a bumper hook attached to said lift carriage assembly and adapted to engage the bumper of an automobile to lift said automobile as required for servicing.

2. The improved portable electrically operated auto jack described in claim 1 except that switch control means for turning said electric motor off and on and for controlling the direction of rotation thereof is connected to the motor and electromechanical parts of the jack by means of a remote control cable that permits the operator to stand in a position of safety on the side of the auto while operating the jack.

3. The improved electric auto jack described in claim 1 together with handle means at the upper end of said lift shaft to enable the operator to position and manipulate said jack from a standing position.

4. A portable electrically operated automobile jack comprising:
   A. a base plate adapted to lie securely on the ground and provided with a securing and support well in its upper surface for an upright member;
   B. an elongated insertable-removable and vertically positionable lift shaft housing structure having a generally square cross section shape and
      1. adapted to seat in the well provided in the upper surface of the base plate,
      2. being provided with a longitudinal slot-like opening in one face of the housing structure,
      3. a closure member across the upper end of said lift shaft housing, and
      4. a bearing opening in the upper end of said lift shaft housing, and
      5. a gear engagement opening provided in the upper face of the side of said lift shaft housing that is opposite to the previously mentioned slot-like opening;
   C. a rotatable lift shaft vertically positioned within said lift shaft housing having
      1. a worm gear surface cut into most of the length of said vertical lift shaft,
      2. at least one support bearing surface to provide support mounting engagement with the bearing provisions in said lift shaft housing, and
      3. a rotary motion transfer gear mounted at an intermediate point near the upper end of said lift shaft in such position as to extend into the gear engagement opening in said lift shaft housing;
   D. a generally rectangular drive mechanism housing structure mounted on the rear side of the vertically positioned housing for said rotatable lift shaft with appropriate openings in the exterior surfaces of said drive mechanism housing;
   E. a reversable electric drive motor capable of operating from a DC voltage source, such as the battery of the automobile with which the jack is to be used, said motor being mounted inside the drive mechanism housing structure;
   F. a power connector cable adapted to connect between the electric drive motor and a suitable DC power source;
   G. a control cable in series with the electric motor with a switch box having
      1. a first switch driving the electric motor in a clockwise direction while the switch is depressed, and
      2. a second switch closing a circuit that will cause the motor to be driven in a counter-clockwise direction when depressed;
   H. a brake shoe attached at an intermediate point on the drive shaft of said electric motor with appropriate handle control means for setting and releasing said brake;
   I. a standard gear box assembly mounted inside said drive mechanism housing structure to reduce the speed of rotation and to increase the torque, said gear box assembly having 1. an input shaft coupled to the end of the drive shaft from the electric motor, and
2. an output gear drive shaft;

J. a set of torque transfer gears with one of said gears being mounted on the output gear drive shaft of said gear box assembly and the other meshing gear being mounted on the upper end of said rotatable lift shaft in such position as to extend into the bearing opening in the upper end of said lift shaft housing so that rotary drive torque is transfered from said electric motor and gear box assembly to the rotatable lift shaft; and K. a lift carriage assembly provided with
1. an internal gear mechanism adapted to mate with the worm gear surface on the lift shaft and make the lift carriage ride up or down the lift shaft depending upon the direction of rotation of said lift shaft, and
2. a suitable bumper hook hingedly connected to the forward side of the lift carriage and being adapted to engage and support the bumper of an automobile.

5. The improved portable electrically operated auto jack described in claim 4 except that switch control means for turning said electric motor off and on for controlling the direction of rotation thereof is connected to the motor and electromechanical parts of the jack by means of a remote control cable that permits the operator to stand in a position of safety on the side of the auto while operating the jack.

6. The improved electric auto jack described in claim 4 together with handle means at the upper end of said lift shaft to enable the operator to position and manipulate said jack from a standing position.

* * * * *